(12) United States Patent
Franzen et al.

(10) Patent No.: US 6,774,999 B2
(45) Date of Patent: Aug. 10, 2004

(54) APPARATUS AND METHOD FOR CHARACTERIZING THE TONER CONCENTRATION IN A DEVELOPER OF A PRINTING DEVICE

(75) Inventors: James J. Franzen, Fairport, NY (US); Paul A. Garsin, Webster, NY (US); Edward W. Smith, Jr., Rochester, NY (US); Eric M. Gross, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 127 days.

(21) Appl. No.: 09/940,058

(22) Filed: Aug. 27, 2001

(65) Prior Publication Data

US 2003/0038939 A1 Feb. 27, 2003

(51) Int. Cl.[7] .............................. G01J 3/46; G03G 15/08
(52) U.S. Cl. .......................................... 356/425; 399/30
(58) Field of Search ............................. 399/53, 57, 62, 399/64, 27–30; 356/337, 409, 446, 425, 432–442, 405, 406, 326, 328; 250/428, 432 R, 573, 574, 576; 358/406, 504

(56) References Cited

U.S. PATENT DOCUMENTS

| | | | | |
|---|---|---|---|---|
| 3,872,825 A | * | 3/1975 | Davidson | 118/691 |
| 4,026,643 A | * | 5/1977 | Bergman | 399/60 |
| 4,273,843 A | * | 6/1981 | Fujita et al. | 430/30 |
| 4,451,135 A | * | 5/1984 | Okumura | 399/65 |
| 4,943,735 A | * | 7/1990 | Nishikawa | 250/573 |
| 5,342,722 A | * | 8/1994 | Ito et al. | 430/109.2 |
| 5,359,437 A | * | 10/1994 | Hibi | 358/529 |
| 5,512,978 A | * | 4/1996 | Mosher et al. | 399/57 |
| 6,201,936 B1 | | 3/2001 | Gross et al. | |
| 6,535,700 B1 | * | 3/2003 | Caruthers | 399/57 |

* cited by examiner

*Primary Examiner*—Zander V. Smith
*Assistant Examiner*—Gordon J. Stock, Jr.
(74) *Attorney, Agent, or Firm*—Fay, Sharpe, Fagan, Minnich & McKee, LLP (57) ABSTRACT

An apparatus (100) for measuring toner concentration in a developer contained in a developer housing (10) includes a developer sample container (102) that receives a portion of developer extracted from the developer housing (10). A spectrophotometer (112) measures spectrophotometric data for the portion of the developer in the developer sample container (102). A processor (116) estimates the toner concentration based on the measured spectrophotometric data and a pre-determined relationship (118) between the spectrophotometric data and the toner concentration. A method (200) for estimating the toner concentration in a developer comprising a toner and a carrier includes measuring (220) a color characteristic of the developer, comparing (222) the measured color characteristic with a pre-determined relationship between the color characteristic and the toner concentration, and estimating (226) the toner concentration based on the comparing.

21 Claims, 7 Drawing Sheets

APPARATUS AND METHOD FOR CHARACTERIZING THE TONER CONCENTRATION IN A DEVELOPER OF A PRINTING DEVICE

BACKGROUND OF THE INVENTION

The present invention relates to the printing and xerographic arts. It finds particular application in conjunction with the monitoring and control of developer materials, and will be described with particular reference thereto. However, it is to be appreciated that the present invention will also find application in other printing and xerographic systems where the concentration of toner or other materials or chemicals used in the printing process is advantageously calibrated, monitored, or controlled.

In many printing and xerography systems, images are formed on paper or another medium using electrophotographic printing. In this method, a photoreceptive surface is uniformly electrostatically charged, and the image is transferred to the photoreceptive surface through selective exposure to light or other electromagnetic radiation. The light discharges the exposed areas of the photoreceptive surface to form an electrostatic charge pattern known as the latent image. The latent image is developed by exposure to a developer material that selectively coats the charged surface areas. A typical two-component developer includes toner particles comprising a polymer or resin with a color agent, and carrier beads comprising resin-coated spheres of steel or another material. The carrier beads are usually several times larger than the toner particles. The toner particles triboelectrically bond to the larger, spherical carrier beads to form composite developer particles. In the vicinity of the electrostatically charged regions of the latent image, the toner particles are attracted away from the carrier beads and attach onto the photoreceptor due to the greater electrostatic attraction of the photoreceptor versus the triboelectric bonding to the carrier beads. The thusly developed latent image is known as the toner image. The toner image is transferred to the paper or other print medium using a corona discharge to effectuate transfer of the toner particles from the toner image onto the paper. Finally, a fusing process employing heat and pressure permanently affixes the toner onto the paper to form the final printed image.

In the case of color printing, several toner stations are employed, e.g. in the case of CMYK printing separate toner stations for printing the cyan, magenta, yellow, and black (K) image components. A full color toner image is thus produced which is transferred to the final print medium and fused in a manner similar to that just described. An electrophotographic printing apparatus typically includes additional components to monitor the electrostatic potentials, image characteristics, and other aspects of the complex printing process.

An important system parameter for obtaining consistently high quality electrophotographic printing is control of the developer composition. The toner concentration is typically defined as the ratio of the weight of the toner to the weight of the carrier in the developer. During printing, toner is gradually depleted whereas the carrier beads do not transfer to the paper. Thus, the toner concentration in the developer decreases over time with usage.

Figure 1:
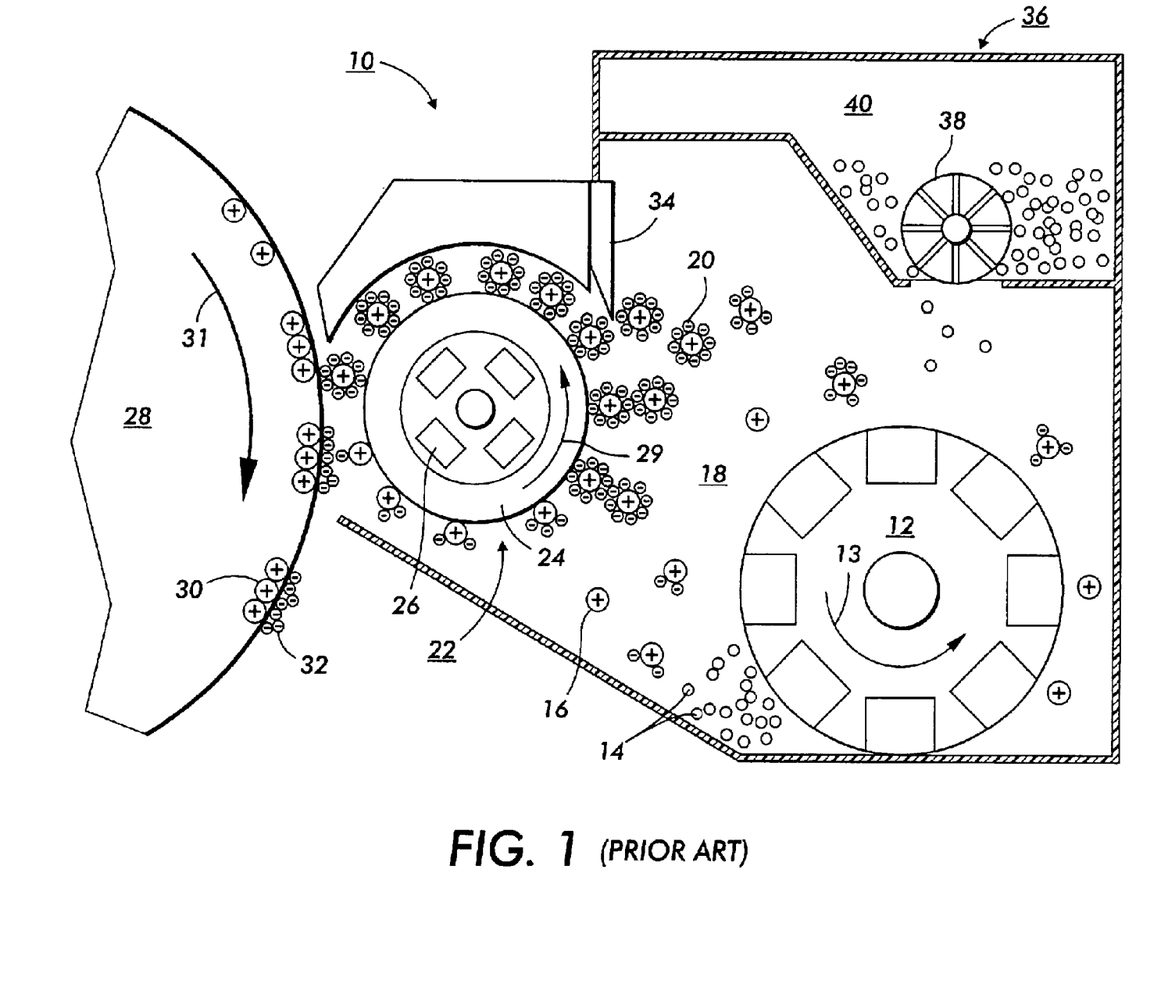
FIG. 1 schematically depicts a developer housing according to the prior art for an electrophotographic printing apparatus.

With reference to FIG. 1, a developer housing 10 that stores, maintains, and applies the developer is described. A mixing wheel 12 rotates in a direction 13 and mixes toner particles 14 and carrier beads 16 in a developer sump 18. Under the action of the mixing wheel 12, the toner particles 14 triboelectrically bond to the carrier beads 16 to form composite developer particles 20, each of which includes a plurality of toner particles 14 surrounding a single carrier bead 16. Note that the toner particles 14 and the carrier beads 16 are shown schematically in FIG. 1 and are not drawn to scale. In a typical developer, the carrier beads 16 are several times larger than the toner particles 14, and both are much smaller than they are shown in FIG. 1. A magnetic roll 22 comprising a hollow tube 24 and fixed magnets 26 applies the developer particles 20 to the photoreceptor 28 (shown in part). The hollow tube 24 of the magnetic roll 22 rotates in a direction 29 as shown and the magnets 26 attract the metallic cores of the carrier beads 16 of the developer particles 20 onto the tube 24. As the hollow tube 24 rotates the attached developer particles 20 are brought into close vicinity with the photoreceptor 28 where the toner particles 14 are pulled off the carrier beads 16 and onto the charged portions comprising the latent image 30. The photoreceptor 28 is typically embodied in the form of a continuous belt loop that rotates in a direction 31 so as to develop the entire latent image 30. The toner coating thus formed comprises the toner image 32. In order to control the thickness of the developer coating on the roll 22, a baffle or metering blade 34 removes excess developer from the roll 22.

As a consequence of the developing process, toner particles 14 are removed from the developer sump 18 to form the toner image 32. As a result, the toner concentration in the developer sump 18 decreases over time and is advantageously replenished. A toner dispenser 36 includes a toner brush 38 that dispenses toner in a controlled fashion from a toner reservoir 40 into the developer sump 18.

The prior art discloses several methods for determining when to replenish the toner, and to determine how much toner to add. In some printing systems, toner dispensing occurs on a fixed schedule, i.e. by a pre-determined use factor, such as one minute of dispensing for every ten minutes of printing. Of course, this type of system rather inflexible. Many printing systems use some sort of automatic dispensing system in which the toner concentration is monitored in some way and toner replenishment occurring responsive to the monitoring. The monitoring process can take place either in the developer housing 10 or on the photoreceptor 28, e.g. by printing a test patch that is characterized by optical reflectance or other means. Monitoring on the photoreceptor 28 has the disadvantage of introducing additional factors which can affect the toner image 32, such as variations in electrostatic charge of the photoreceptor 28. Monitoring in the developer housing 10 involves measurement of the toner concentration in the developer sump 18. The prior art discloses use of an in situ magnetic permeability sensor, commonly known as a packer sensor (not shown in FIG. 1), for monitoring the toner concentration in the developer sump 18. The packer sensor detects changes in the magnetic permeability of the developer material due to changes in the average spacing of the metallic cores of the carrier beads 16 due to changes in the toner concentration. The packer sensor has the disadvantage of being a relative sensor. There remains an unfulfilled need in the art for a convenient method and apparatus for obtaining absolute quantitative information on the toner concentration in a developer which can be used, for example, to calibrate a packer sensor.

The present invention contemplates a new and improved method and apparatus therefor which overcomes the above-referenced problems and others.

SUMMARY OF THE INVENTION

In accordance with one aspect of the present invention, an apparatus for measuring toner concentration in a developer contained in a developer housing is disclosed. A developer sample container receives a portion of developer extracted from the developer housing. A spectrophotometer measures spectrophotometric data for the portion of the developer in the developer sample container. A processor estimates the toner concentration based on the measured spectrophotometric data and a pre-determined relationship between the spectrophotometric data and the toner concentration.

In accordance with another aspect of the present invention, a method for measuring toner concentration in a developer is disclosed. A sample of the developer is extracted. Color characteristics of the developer sample are measured. The toner concentration is estimated based on the measured color characteristics.

In accordance with yet another aspect of the present invention, a method for estimating the toner concentration in a developer comprising a toner and a carrier is disclosed. A color characteristic of the developer is measured. The measured color characteristic is compared with a pre-determined relationship between the color characteristic and the toner concentration. The toner concentration is estimated based on the comparing.

Numerous advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 2:
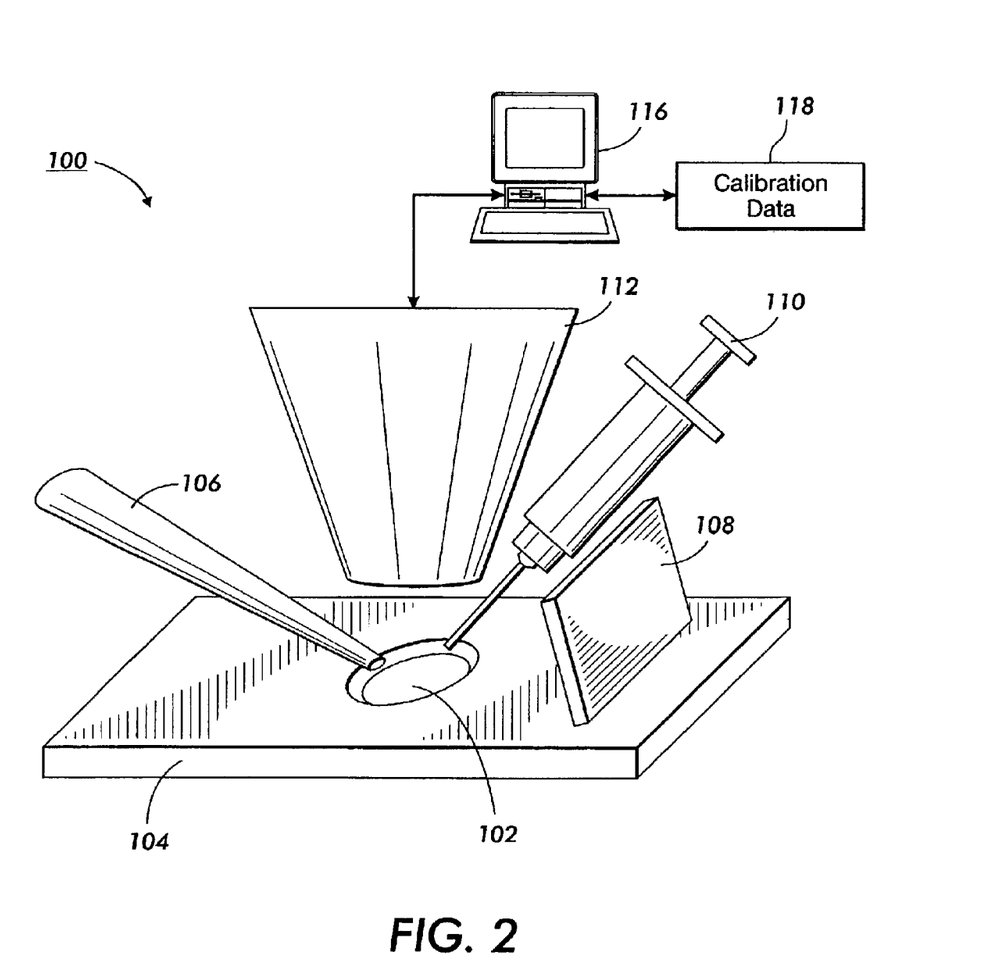
FIG. 2 schematically depicts an apparatus which suitably practices an embodiment of the invention.

With reference to FIG. 2, an apparatus 100 for characterizing the toner concentration in a developer of a printing or xerographic device according to one embodiment of the invention is described. A sample of the developer (not shown) is placed into a sample container, which in the illustrated embodiment comprises a small depression 102 in a flat surface 104, using an appropriate sample dispenser 106. For accurate color measurement, a well-defined reflective surface is defined in the sample. In the illustrated embodiment, this surface can be defined two ways. The developer sample surface can be leveled using a leveling device such as a strip of shim stock 108. In another approach, the developer sample can be mixed with a surfactant or solvent, e.g. dispensed by a syringe 110, to form a liquid sample. In the latter case, the ratio of developer mass to solvent mass should be determined to enable standardized measurements. The choice of solvent or surfactant material will depend upon the type of developer; however, it will be appreciated that the solvent-diluted sample can advantageously have an improved dynamic range of color attributes which translates into more precise and sensitive toner concentration measurements. Although in the illustrated embodiment the mixing of the developer and the solvent or surfactant occurs in the small depression 102, depending upon the efficiency of the mixing process it can be preferable to mix the developer with the solvent or surfactant first, e.g. in a beaker or test tube, prior to transferring a portion of the mixture into the small depression 102 for spectrophotometric characterization.

Once a sample having a well-defined surface is situated in the small depression 102, one or more color attributes or color parameters are measured using a spectrophotometer 112. The spectrophotometer can optionally include an integrating sphere (not shown) and can use any optical geometry, e.g. one of the 45/0, 0/45, or diffuse/0 reflection geometries known to the art. Because the developer sample is typically translucent, a reflection geometry is preferred. However, measurements employing a transmission spectrophotometer geometry are also contemplated, particularly in the case of a relatively low concentration of developer mixed into an essentially transparent solvent. In this latter case, the sample container should be essentially transparent in the region of the measurement with well defined top and bottom surfaces. It will be appreciated by those of ordinary skill in the art that spectrophotometric measurements are typically highly dependent upon the optical geometry employed by the spectrophotometer. As a result, a consistent optical geometry, and preferably the same spectrophotometer 112, should be used for both the calibration measurements and the measurements of developer extracted from the developer housing 10.

The spectrophotometer 112 generates conventional color parameters or color attributes, e.g. in the (L*, a*, b*) color space coordinates known to the art. The color attributes or parameter values are communicated to a computer or other electronic data processing device 116 for further processing. Alternatively, the spectrophotometer 112 can measure "raw" spectrophotometric data, e.g. an optical intensity versus wavelength matrix, which is communicated to the computer 116 and is then converted into conventional color space coordinates by processing occurring on the computer 116. The color space coordinates are compared against a pre-determined relationship (i.e., calibration data) 118 between one or more of the color space coordinates and the toner concentration. Based upon the comparison, toner concentration in the developer sample is estimated from the spectrophotometric measurements. Although the comparison and estimation is done electronically using the computer 116 in the apparatus 100 shown in FIG. 2, it will be appreciated that the comparison could be performed manually, e.g. by comparing the spectrophotometric data with a hard copy of one or more calibration curves.

It will be recognized by those of ordinary skill in the art that the apparatus depicted in FIG. 2 is readily constructed in typical printing and lithographic shops. The principle components, namely the computer 116 and the spectrophotometer 112, are often already available in these shops. In particular, spectrophotometers are commonly used in printing and lithography to monitor the color quality and characteristics of color prints, e.g. for generating toner reproduction curves. Thus the apparatus of FIG. 2 enables convenient obtaining of absolute, quantitative toner concentration measurements.

Figure 3:
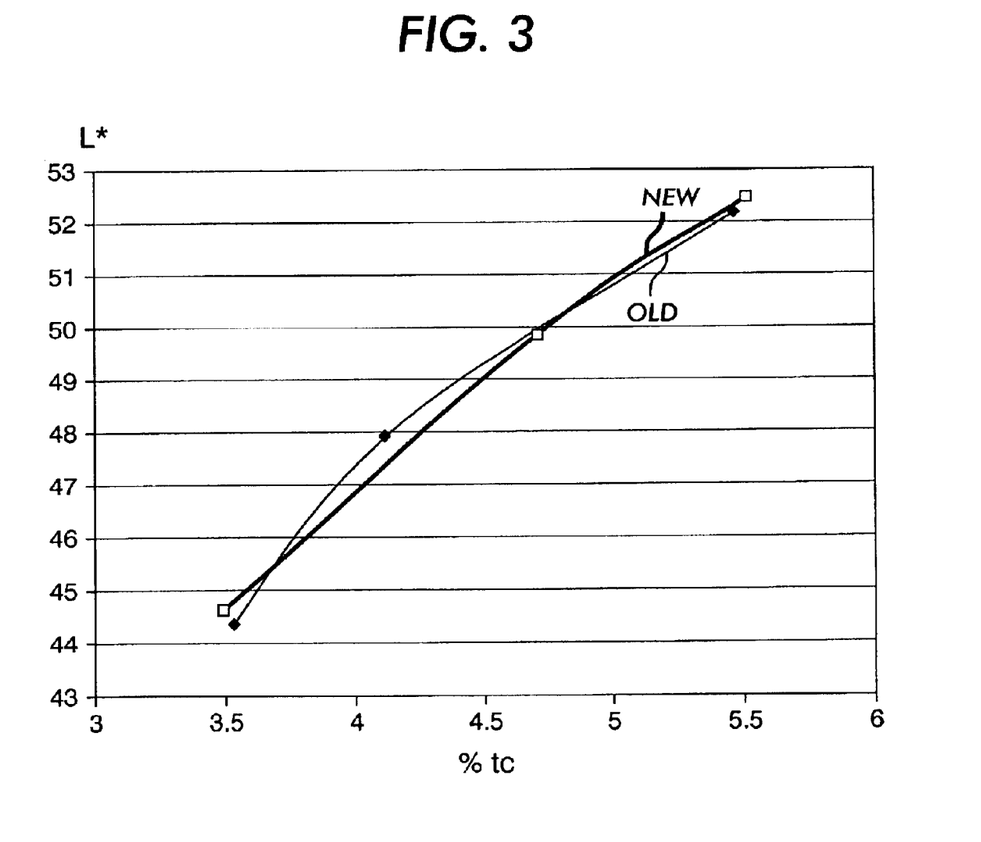
FIG. 3 shows an experimental graph of the L* color parameter or attribute of a series of developer samples plotted against toner concentration for new developer and for developer which has been used to print 40,000 prints, which data provides a suitable pre-determined empirical relationship or calibration data for inclusion as a component of an apparatus that suitably practices an embodiment of the invention.
Figure 4:
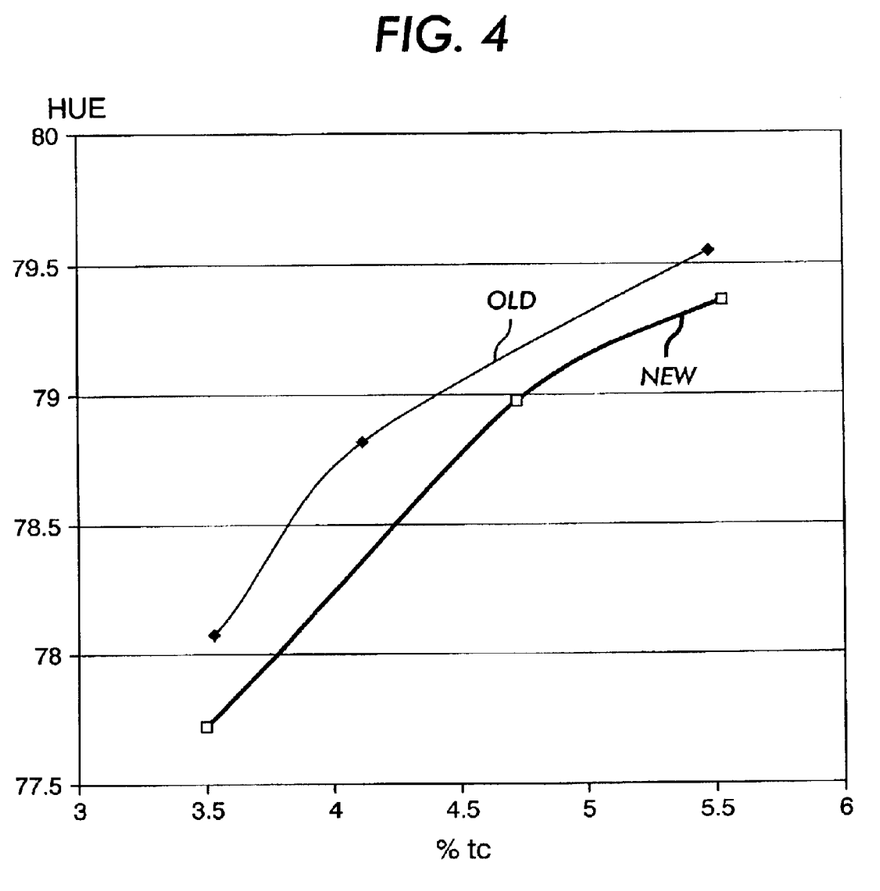
FIG. 4 shows an experimental graph of the hue color parameter or attribute of the series of developer samples of FIG. 3 plotted against toner concentration.
Figure 5:
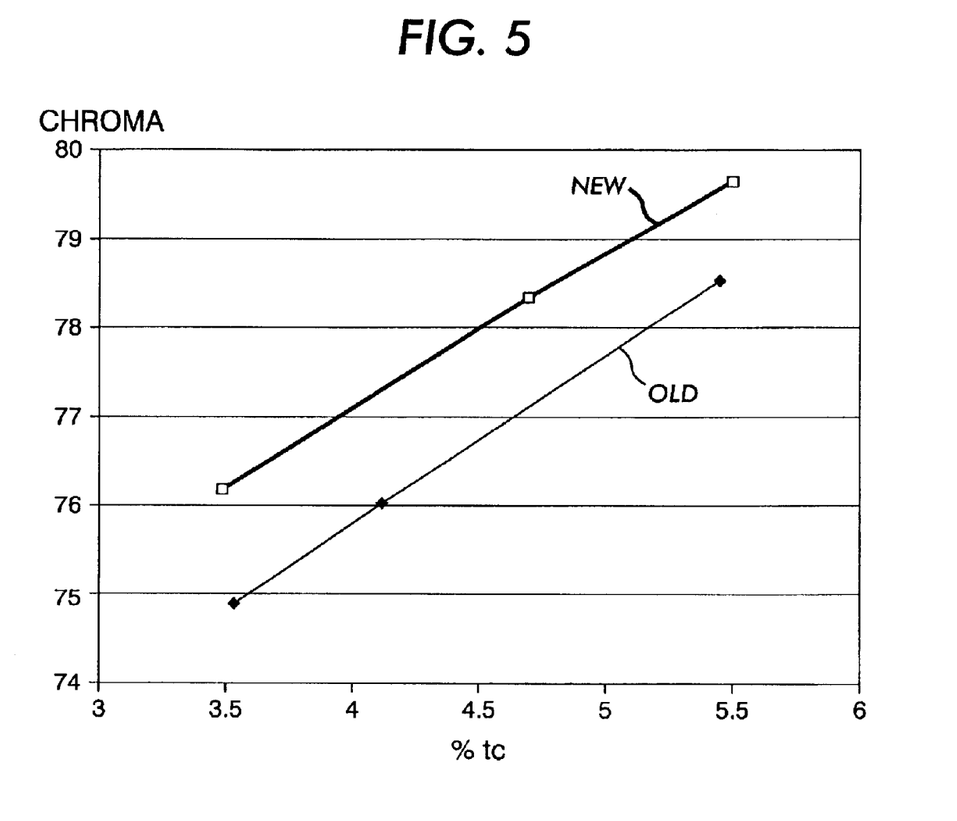
FIG. 5 shows an experimental graph of the chroma color parameter or attribute of the series of developer samples of FIG. 3 plotted against toner concentration.

With reference to FIGS. 3, 4, and 5, pre-determined empirical relationships between the toner concentration and the L*, hue, and chroma color parameters or attributes that are suitable alone or in combination for use as the calibration data 118 in the apparatus of FIG. 2 is described. The graphs shown in FIGS. 3, 4, and 5 were experimentally obtained in the following manner. Six calibration samples of M4 developer (a well-known developer) were prepared as follows:

| Sample # | Toner Concentration | Usage |
|---|---|---|
| 1 | 3.49% | New |
| 2 | 4.72% | New |
| 3 | 5.53% | New |
| 4 | 3.53% | 40,000 prints |
| 5 | 4.12% | 40,000 prints |
| 6 | 5.48% | 40,000 prints | where the listed toner concentrations of the new developer samples was determined by the mass ratio of the developer and carrier which was mixed to form the new developer sample. The listed toner concentrations of the used samples 4, 5, and 6 which were obtained from developer housings after 40,000 prints were determined by physical separation and weighing of the toner and carrier components of the developer sample. Spectrophotometric measurements of the samples 1–6 were obtained using an X-rite 938 spectrodensitometer (a hand-held instrument having spectrophotometric capabilities).

As seen in FIG. 3, the L* parameter varied by about $8\Delta E_{cmc}$(44.5 to 52.5) over approximately 2% change in toner concentration (3.5% to 5.5%). As seen in FIG. 4, the hue parameter varied by about $2\Delta E_{cmc}$(77.7 to 79.6) over the same approximately 2% change in toner concentration (3.5% to 5.5%). As seen in FIG. 5, the chroma parameter varied by about $4\Delta E_{cmc}$(74.9 to 79.6) over the aforementioned approximately 2% change in toner concentration (3.5% to 5.5%). It will further be observed that the hue and chroma color attributes show a significant difference for the new and used M4 developer, due to changes in the characteristics of the carrier beads resulting from the usage. From the experimental data shown in FIGS. 3, 4, and 5, it is apparent that the L* color attribute is the optimal choice for use as the calibration data 118 in the apparatus of FIG. 2. The L* graph shows a linear variation with toner concentration, very little change after 40,000 print usage, and provides a wide $8\Delta E_{cmc}$ dynamic range for toner concentrations ranging from about 3.5% to about 5.5%. However, the hue and chroma data of FIGS. 4 and 5 also show relatively linear dependencies on toner concentration, particularly for the chroma color attribute, albeit with smaller dynamic ranges and a significant dependence on the developer usage as is apparent by comparing the plots for new and used developer. Thus, the hue and chroma color parameters can also be used as the calibration data 118, either alone or in combination with the L* data. When using the hue or chroma data, the empirical relationship preferably includes a correction for the number of prints developed by the developer prior to characterization by spectrophotometry.

Although pre-determined empirical relationships between the toner concentration and the L*, hue, and chroma color attributes are derived in the FIGS. 3, 4, and 5 respectively, the employment of other color attributes in the calibration data is also contemplated. For example, pre-determined empirical relationships can likewise be derived for the a* and/or b* parameters of the conventional (L*, a*, b*) color coordinates. Similarly, pre-determined empirical relationships can be derived for color attributes comprising color differences versus a standard developer color, such relationships advantageously incorporating the CMC color difference formulas.

Figure 6A:
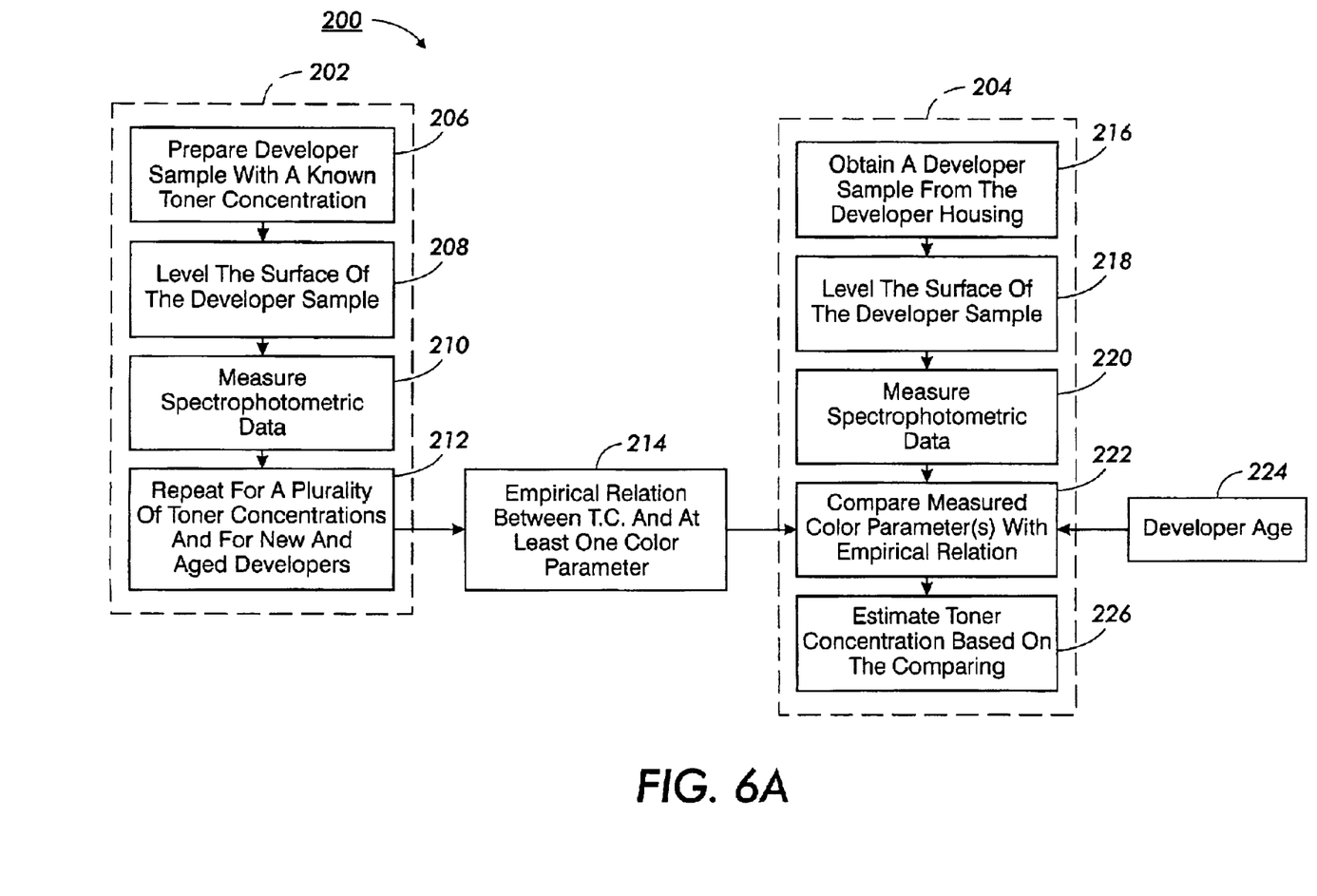
FIG. 6A schematically depicts a method which suitably practices an embodiment of the invention.

With reference to FIG. 6A, a method 200 for characterizing the toner concentration in a developer of a printing or xerographic device according to one embodiment of the invention is described. Broadly speaking, the method includes a step 202 in which one or more empirical relationships or calibration data are obtained which quantitatively relate the color attributes to the toner concentration, and a step 204 in which an actual spectrophotometric measurement of a sample taken from the developer housing is obtained and compared with the calibration data to obtain an absolute, quantitative estimate of the toner concentration.

To develop the calibration data in the step 202, a developer sample is prepared with a known toner concentration in a sub-step 206. This can be done, for example, by weighing out appropriate amounts of toner and carrier material and mixing to form the calibration developer sample. The sample is leveled in a sub-step 208, e.g. using the shim stock 108 as described with reference to FIG. 2. The spectrophotometric data is measured in a sub-step 210, e.g. using the spectrophotometer 112 as described with reference to FIG. 2. This process is preferably repeated for a plurality of developer samples having known toner concentrations in a sub-step 212. The sub-step 212 can also include repetitions with developer samples of various usages, in which case the toner concentration is preferably determined after the usage by physical separation and weighing of the toner and carrier components of the developer sample. Based on the data acquired in the step 202, one or more empirical relationships relating the toner concentration with one or more color attributes are derived in a step 214. Exemplary empirical relationships produced by the step 214 for the L*, hue, and chroma color attributes are shown in FIGS. 3, 4, and 5 respectively for the exemplary M4 developer. The steps 202, 214 typically are done only once for a given developer material to generate the calibration data for that developer, and preferably occasionally thereafter to verify the calibration and to update it to account for shifts in the spectrophotometer or other sources of measurement drift.

In the step 204, an actual sample from a developer housing under test is obtained in a sub-step 216, and the surface of the sample is leveled in a sub-step 218, for example using the shim stock 108. Spectrophotometric measurements are obtained from the sample in a sub-step 220. In a sub-step 222, selected spectrophotometric parameters are compared with the empirical relationships that were derived in the step 214, taking into account the developer usage 224 if the empirical relationships indicate a dependence of the spectrophotometric parameter or parameters on usage. Based on the comparing sub-step 222, the toner concentration is estimated in a sub-step 226. It will be appreciated that the step 204 can be repeated for different developer samples from different developer housings insofar as empirical relationships such as those obtained in the step 214 are available for the developer materials involved.

Figure 6B:
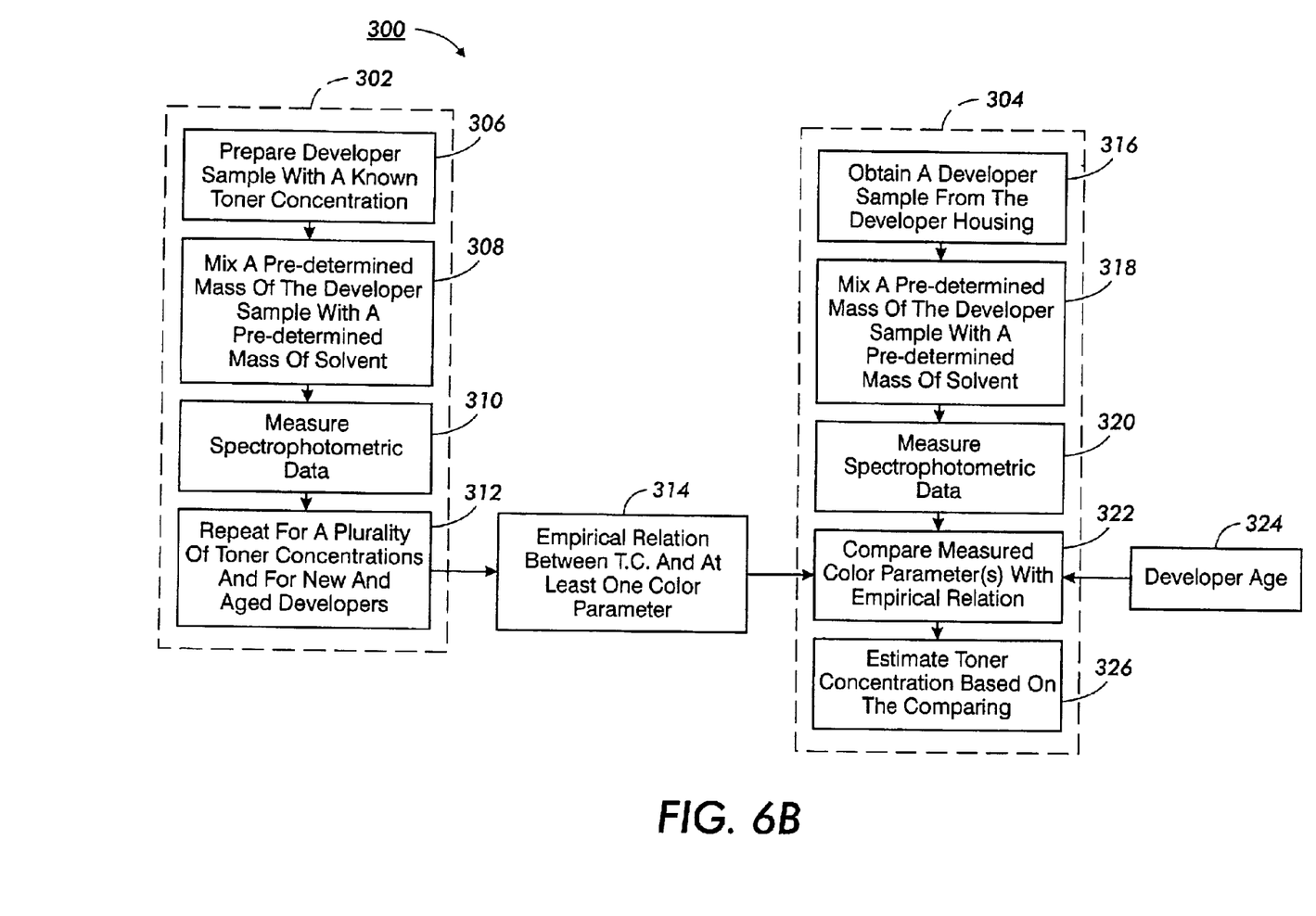
FIG. 6B schematically depicts another method which suitably practices an embodiment of the invention.

With reference to FIG. 6B, another method 300 for characterizing the toner concentration in a developer of a printing or xerographic device is described. Broadly speaking, the method includes a step 302 in which one or more empirical relationships or calibration data are obtained which quantitatively relate the color attributes to the toner concentration, and a step 304 in which an actual spectrophotometric measurement of a sample taken from the developer housing is obtained and compared with the calibration data to obtain an absolute, quantitative estimate of the toner concentration. The method 300 of FIG. 6B differs from the method 200 of FIG. 6A in that the developer sample preparation includes mixing with a solvent or a surfactant.

To develop the calibration data in the step 302, a developer sample is prepared with a known toner concentration in a sub-step 306. This can be done, for example, by weighing out appropriate amounts of toner and carrier material and mixing to form the developer. A pre-determined mass of the developer sample is mixed with a pre-determined mass of solvent or surfactant in a sub-step 308, e.g. using the syringe 110 to add the solvent or surfactant as shown in FIG. 2. The spectrophotometric data is measured in a sub-step 310, e.g. using the spectrophotometer 112 as described with reference to FIG. 2. This process is preferably repeated for a plurality of developer samples having known toner concentrations in a sub-step 312. The sub-step 312 can also include repetitions with developer samples of various usages, in which case the toner concentration is preferably determined after the usage by physical separation and weighing of the toner and carrier components of the developer sample. Based on the data acquired in the step 302, one or more empirical relationships relating the toner concentration with one or more color attributes are derived in a step 314. The steps 302, 314 typically are done only once for a given developer material to generate the calibration data for that developer, and preferably occasionally thereafter to verify the calibration and to update it to account for shifts in the spectrophotometer or other sources of measurement drift.

In the step 304, an actual sample from a developer housing under test is obtained in a sub-step 316, and a pre-determined mass of the sample is mixed with a pre-determined mass of surfactant or solvent in a sub-step 318, e.g. using the syringe 110 to add the surfactant or solvent as shown in FIG. 2. Of course, for a valid comparison of the sample from the developer housing with the calibration samples processed in the step 302, the mixing with the solvent in the sub-step 318 should be performed in essentially similar fashion to the mixing with the solvent performed in the sub-step 308 in which the calibration samples were prepared. Spectrophotometric measurements are obtained from the sample in a sub-step 320. In a sub-step 322, selected spectrophotometric parameters are compared with the empirical relationships that were derived in the step 314, taking into account the developer usage 324 if the empirical relationships indicate a dependence of the spectrophotometric parameter or parameters on usage. Based on the comparing sub-step 322, the toner concentration is estimated in a sub-step 326. It will be appreciated that the step 304 can be repeated for different developer samples from different developer housings insofar as empirical relationships such as those obtained in the step 314 are available for the developer materials involved.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus for measuring toner concentration in a developer contained in a developer housing, the apparatus comprising:
   a developer sample container that receives a portion of developer extracted from the developer housing;
   a spectrophotometer that measures spectrophotometric data for the portion of the developer in the developer sample container; and
   a processor that estimates the toner concentration based on a pre-determined relationship between at toast one color space coordinate obtained from the spectrophotometric data and the toner concentration.

2. The apparatus asset forth in claim 1, further comprising:
   a surfactant that is mixed with the portion of developer extracted from the developer housing.

3. The apparatus as set forth in claim 1, further comprising a leveling device for leveling the surface of the developer sample.

4. The apparatus as set forth in claim 1, wherein one of the processor and the spectrophotometer computes color space coordinates including the at least one color space coordinate from the spectrophotometric data.

5. The apparatus as set forth in claim 1, wherein the spectrophotometer includes:
   a spectrophotometer employing a reflection geometry.

6. The apparatus as set forth in claim 1, wherein the pre-determined relationship further comprises:
   a pre-determined empirical relationship between toner concentration and the at least one color space coordinate.

7. The apparatus as set forth in claim 6, wherein the pre-determined empirical relationship includes:
   an empirical correction for the usage of the developer.

8. The apparatus as set forth in claim 7, further wherein the empirical correction for the usage of the developer comprises:
   an empirical correction that incorporates the number of prints printed using the developer prior to testing with the apparatus into the empirical relationship between toner concentration and the at least one color.

9. An apparatus for measuring toner concentration in a developer contained in a developer housing the apparatus comprising:
   a developer sample container that receives a portion of developer extracted from the developer housing;
   a spectrophotometer that measures spectrophotometric data for the portion of the developer in the developer sample container, and
   a processor that estimates the toner concentration based on the measured spectrophotometric data and a pre-determined empirical relationship between the toner concentration and spectrophotometric data, the predetermined empirical relationship including an empirical relationship between the percent toner concentration end at least one of an L*, a*, b* chroma, hue, and a CMC color difference color parameter.

10. A method for measuring toner concentration in a developer comprising:

extracting a sample of the developer, measuring color characteristics of the developer sample;

estimating the toner concentration based on the measured color characteristics; and mixing the developer sample with a solvent or surfactant odor to measuring.

11. The method as set forth in claim 10, wherein the estimating of the toner concentration based on the measured color characteristics includes accounting for the usage of the developer in the estimating.

12. The method as set forth in claim 10, further wherein the estimating of the toner concentration based on the measured color characteristics includes:

comparing the measured color characteristics with a pre-determined empirical relationship between a color characteristic and the toner concentration wherein said comparing includes correcting for the usage of the developer; and estimating the toner concentration based on the comparison.

13. The method as set forth in claim 10, further comprising:

leveling the developer sample.

14. The method as set forth in claim 10, wherein the estimating of the toner concentration based on the measured color characteristics further comprises:

competing the measured color characteristics with a pre-determined empirical relationship between a color characteristic and the toner concentration; and estimating the toner concentration based on the comparing.

15. The method as set forth in claim 14, wherein the comparing of the measured color characteristics with a pro-determined empirical relationship includes:

comparing at least one of a measured CMC color difference, L*, a*, b*, chrome, and hue color parameter with a pre-determined empirical relationship between the measured parameter and the toner concentration.

16. A method for estimating the toner concentration in a developer comprising a toner end a carrier, the method comprising:

measuring a color characteristic of the developer selected from a group comparing of a CMC color difference, L*, a*, b*, chrome, and hue;

comparing the measured color characteristic with a pie-determined relationship between the color characteristic and the toner concentration; and estimating the toner concentration based on the comparing.

17. The method as set forth in claim 16, further comprising:

in the comparing step, accounting for a change in the color characteristic of the developer due to usage.

18. The method as set forth in claim 17, wherein the accounting for a change in the color characteristic of the developer due to usage includes:

receiving the number of prints which have been printed using the developer; and accounting for the change in the color characteristic using a pre-determined relationship between the color characteristic and the number of prints which have been printed using the developer.

19. The method as set forth in claim 16, wherein the measuring ala color characteristic of the developer comprises:

placing a sample of the developer into a sample container; and measuring the color characteristic of the sample in the sample container.

20. The method as set forth in claim 19, wherein the measuring of a color characteristic of the developer comprises:

leveling a surface the sample of the developer in the sample container.

21. An apparatus for measuring toner concentration in a developer, the apparatus comprising:

a means for extracting a sample of the developer;

a means for measuring color characteristics of the developer sample;

a means for estimating the toner concentration based on the measured color characteristics; and a means for mixing the developer sample with a solvent or surfactant prior to measuring color characteristics.

* * * * *